United States Patent

Engström

[11] 3,909,017
[45] Sept. 30, 1975

[54] SEALING DEVICE
[75] Inventor: Hans B. Engström, Laxholmsbacken, Sweden
[73] Assignee: AB Mecman, Sweden
[22] Filed: Nov. 27, 1973
[21] Appl. No.: 419,278

[30] Foreign Application Priority Data
Dec. 6, 1973  Sweden............................. 15913/72

[52] U.S. Cl. ................ 277/168; 277/171; 277/207; 251/327
[51] Int. Cl.² ......................................... F16J 15/18
[58] Field of Search........ 277/168, 171, 177, 207 R, 277/187; 251/327

[56] References Cited
UNITED STATES PATENTS
1,083,350   1/1914   Davis............................ 277/207 X
2,438,153   3/1948   Dick............................. 277/187 X
3,089,678   5/1963   Grove........................... 277/169 X
3,575,431   4/1971   Bryant........................... 277/171
3,582,094   6/1971   Whittaker........................ 277/177
3,630,485  12/1971   Williams......................... 277/188

Primary Examiner—Samuel B. Rothberg
Attorney, Agent, or Firm—Wenderoth, Lind & Ponack

[57] ABSTRACT

An elastic sealing ring inserted in a reversed T-shaped peripheral groove in a cylindrical surface has a cross section composed of a rounded head portion projecting slightly from the groove and dimensioned to leave a good clearance in relation to the opposite walls of the outer groove portion, a wider and substantially rectangular base portion dimensioned to be closely fitted in the undercut groove portion, and a narrower neck portion connecting the head portion symmetrically to one side of the base portion.

2 Claims, 3 Drawing Figures

3,909,017

SEALING DEVICE

BACKGROUND OF THE INVENTION

The invention relates to a sealing device of the type which comprises a peripheral groove in a cylindrical surface and an elastic sealing ring inserted in the groove in such a way that a minor portion thereof projects radially from the surface to seal against an opposite cylindrical surface coaxial to the grooved surface.

A common sealing ring for such purposes has a circular cross section, i.e. the so called "O-ring" which is very often mounted on pistons within working cylinders and slide valves. When such a ring carried by a piston passes an edge portion or a step on the surrounding cylinder surface, as is the case at inlet and outlet ports, for instance, it will be influenced by a force directed axially, so that a section of the ring is more or less tilted in its groove. Hereby a pressure fluid entrapped at one side of the ring may penetrate beneath the ring and lift it partly out of its groove. This results in a temporary leakage, and at the same time the edge portion subjects the raised ring section to a hard wear, which, in turn, results in a successive increase of the leakage up to an intolerable deterioration of the sealing effect so that the ring must be replaced.

SUMMARY OF THE INVENTION

The object of the present invention is to provide a sealing device which, at least for the most part, eliminates the inconveniences mentioned above. For that purpose, the groove adapted to receive the elastic ring is reversed T-shaped in cross section, and the ring has its cross section composed of a rounded head portion, an essentially wider, approximately rectangular base portion and a narrower neck portion connecting the head portion symmetrically to one side of the base portion. The base portion is dimensioned to be closely fitted in the undercut bottom portion of the groove, preferably during some compression, and the head portion which projects slightly outside the groove is dimensioned to leave a good clearance in relation to the walls of the outer portion of the groove.

When the sealing ring designed and mounted in this way is affected by a force directed axially, the only result will be that the narrow neck portion of the ring permits a section of the outer head portion to be bent onto the rear side wall of the groove, as seen in the direction of the axial force. During this bending the pertaining base portion of the ring is pressed at a greater force against an opposite wall section in the undercut bottom portion of the groove and is thus retained in place with security, so that leakage as well as increased wear is avoided.

BRIEF DESCRIPTION OF PREFERRED EMBODIMENTS

The invention will be further described in the following with reference to the accompanying drawings in which FIG. 1 shows a cross section through a sealing device designed according to the invention.

FIG. 2 shows a cross section through a similar but slightly modified embodiment, and FIG. 3 shows diagrammatically a longitudinal and axial section through the half of a sliding valve having sealing devices made according to the invention.

DETAILED DESCRIPTION OF PREFERRED EMBODIMENTS

Figure 1:
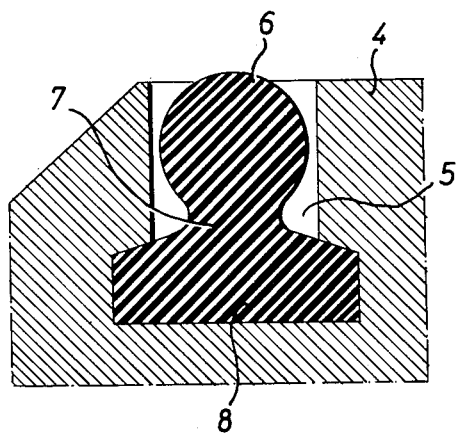

FIG. 1 shows an axial section through a portion of a slide member 4 adapted to be moved in a valve. The slide member 4 has an undercut groove 5 approximately T-shaped in cross section and adapted to receive a sealing ring of rubber or similar elastic material. As seen in cross section, this ring has a substantially circular outer portion 6 which is connected to a substantially rectangular base portion 8 by means of a narrower neck portion 7. The base portion 8 is dimensioned to be closely fitted in the undercut portion of the groove 5, but at the same time a good clearance is provided between the outer "head portion" 6 and the opposite walls of the outer portion of the groove 5. In the common way, the head portion 6 of the ring projects a little outside the groove 5 to seal against an opposite cylindrical surface, not shown in FIG. 1. Of course, the head portion 6 need not be exactly circular; it may also be rounded in some other way, such as oval or pear-shaped.

Figure 2:
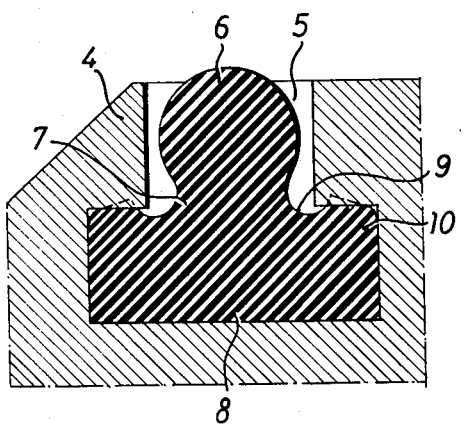

The embodiment shown in FIG. 2 differs from the one in FIG. 1 only by that the base portion 8 of the ring is designed with a peripheral chute 9 at each side of the central narrow neck portion 7 while the outer wall of each chute is formed by a raised bead 10 on the base portion 8, the head 10 serving to seal against the opposite undercut wall in the groove. As is indicated by dotted lines in FIG. 2, the two beads 10 are dimensioned to be slightly compressed when introduced in the undercut groove portions, so that the base portion 8 is subjected to a permanent prestressing which also contributes to retaining it in its place. Of course, also the base portion 8 in FIG. 1 may be dimensioned to be subjected to a prestressing in the undercut groove portion, but the embodiment in FIG. 2 may be preferable at least at high pressure usage, because the beads 10 outside the chutes 9 may then serve as a type of lip seals.

Figure 3:
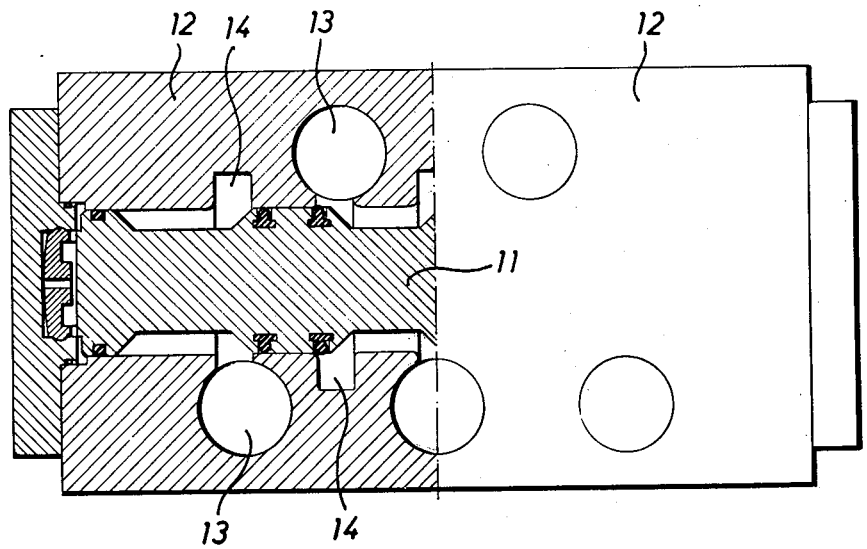

The valve shown partially in FIG. 3 has a slide member 11 provided with the sealing devices described above. The valve housing 12 is designed with ports 13 which communicate with annular grooves 14 in the cylindrical inner side of the housing. Above all, axial forces acting on the sealing rings will occur, when the outer portions of the rings hit the rather sharp edges at the walls of these grooves 14. As is already pointed out above, the invention has to a great extent eliminated the inconveniences caused by these edges, and thereby the sealing rings will have a longer life than before.

It is obvious that, within the scope of the invention, the sealing device may also be arranged on the inside of a cylinder, in which case the embodiments described above may be said to be turned inside out.

What I claim is:

1. A sealing device comprising:
    a peripheral groove in a cylindrical surface, said groove having a reversed T-shaped cross section with an undercut groove portion and an outer groove portion; and
    a sealing ring of elastic material inserted in said groove, said sealing ring having its cross section composed of a rounded head portion extending slightly outside said groove to seal against an opposite cylindrical surface and dimensioned to be spaced at all portions thereof from opposite walls of said outer groove portion, an essentially wider and approximately rectangular base portion dimensioned to closely fit in said undercut groove portion, a neck portion narrower than said head portion connecting said head portion symmetrically to one side of said base portion, and a peripheral chute formed in said base portion of said ring closely adjacent each side of the central neck portion, said chutes having outer walls formed by raised beads on said base portion designed to be compressed in said undercut groove portion.

2. A sealing device as claimed in claim 1, wherein said base portion of said sealing ring is dimensioned to be subjected to a permanent prestressing in said undercut groove portion.

* * * * *